(12) United States Patent
Auer

(10) Patent No.: US 9,132,885 B2
(45) Date of Patent: Sep. 15, 2015

(54) BICYCLE DERAILLEUR

(75) Inventor: Marcus Auer, Schwebheim (DE)

(73) Assignee: SRAM, LLC, Chicago, IL (US)

( * ) Notice: Subject to any disclaimer, the term of this patent is extended or adjusted under 35 U.S.C. 154(b) by 986 days.

(21) Appl. No.: 12/567,887

(22) Filed: Sep. 28, 2009

(65) Prior Publication Data

US 2010/0081527 A1 Apr. 1, 2010

(30) Foreign Application Priority Data

Sep. 29, 2008 (DE) .......................... 10 2008 049 360

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/135 | (2010.01) |

(52) U.S. Cl.
CPC ..................................... *B62M 9/135* (2013.01)

(58) Field of Classification Search
CPC .... B62M 9/1342; B62M 9/136; B62M 9/135; B62M 9/1348; B62M 9/137
USPC .......................................... 474/80, 82; 24/483
See application file for complete search history.

(56) References Cited

U.S. PATENT DOCUMENTS

| | | | |
|---|---|---|---|
| 4,223,562 A * | 9/1980 | Nagano et al. .................. 474/82 |
| 4,675,952 A | 6/1987 | Nagano | |
| 5,607,367 A * | 3/1997 | Patterson ......................... 474/80 |
| 5,624,336 A * | 4/1997 | Kojima ............................ 474/82 |
| 6,146,298 A * | 11/2000 | Nanko ............................. 474/80 |
| 6,629,903 B1 * | 10/2003 | Kondo ............................. 474/82 |
| 6,902,503 B2 * | 6/2005 | Nanko ............................. 474/80 |
| 6,962,544 B2 * | 11/2005 | Nanko ............................. 474/80 |
| 7,081,058 B2 * | 7/2006 | Nankou .......................... 474/80 |
| 7,438,657 B2 * | 10/2008 | Nakai et al. .................... 474/80 |
| 7,503,863 B2 * | 3/2009 | Ichida et al. ................... 474/80 |
| 7,722,486 B2 * | 5/2010 | Nanko ............................. 474/80 |
| 2004/0157690 A1 * | 8/2004 | Nankou .......................... 474/80 |

FOREIGN PATENT DOCUMENTS

| | | |
|---|---|---|
| DE | 35 15 589 A1 | 11/1985 |
| DE | 10 2007 008 326 A1 | 8/2008 |
| EP | 1 447 317 A2 | 8/2004 |
| EP | 1 944 230 B1 | 7/2008 |
| GB | 7 87 446 A | 12/1957 |

* cited by examiner

*Primary Examiner* — Henry Liu
(74) *Attorney, Agent, or Firm* — Milan Milosevic; Lisa Serdynski

(57) ABSTRACT

A derailleur is configured to be mounted to a bicycle frame. The derailleur includes a clamp mountable to the bicycle frame. The clamp includes a first end having a threaded portion receiving a clamp fastener for tightening of the clamp about the bicycle frame. A base member is connected to the clamp and includes a bore receiving the clamp fastener. A chain guide receives and laterally displaces a chain. First and second link members pivotably connect the base member and the chain guide. One of the link members includes an opening aligned with the bore such that the clamp fastener passes through the opening and into the bore of the base member.

8 Claims, 2 Drawing Sheets

BICYCLE DERAILLEUR

BACKGROUND OF THE INVENTION

The present invention relates to bicycle derailleurs, and more particularly, to a derailleur having a hidden, yet accessible, clamp fastener.

European patent application 1 447 317 A1 discloses a front derailleur including a fixed base member mountable to a seat tube of a bicycle frame, a movable chain guide for shifting the bicycle chain and pivotal inner and outer link members therebetween. The outer link member is integral with a cable-actuated lever connected to a control cable which is pulled or released to displace the chain guide. A spring is disposed between the inner link member and the chain guide to bias the chain guide toward the seat tube. The base member includes a clamp having fixed and pivotal arms. The pivotal arm is placed about the seat tube and tightened to the fixed arm using a fastener threadably received by a hole in the fixed arm. A disadvantage of this clamp is that the fastener is protrudingly configured and exposed to the elements.

SUMMARY OF THE INVENTION

One embodiment of the present invention provides a derailleur mountable to a bicycle frame. The derailleur generally includes a clamp, a base member, a chain guide and first and second link members. The clamp is mountable to the bicycle frame and includes a first end having a threaded portion for receiving a clamp fastener for tightening of the clamp about the seat tube. The base member is connected to the clamp and includes a bore for receiving the clamp fastener. The chain guide receives and laterally displaces a chain. First and second link members pivotably connect the base member and the chain guide. One of the link members includes an opening aligned with the bore such that the clamp fastener passes through the opening and into the bore of the base member. In one embodiment, the clamp is mountable to a seat tube of the bicycle frame. The base member forms an upper terminus of the derailleur. The first and second link members extend downwardly toward the chain guide. One of the first and second link members are pivotally biased toward a rest position. The clamp fastener is installed and uninstalled through the opening in one of the link members. The base member includes a ramp slidably guiding the first end of the clamp during threading of the clamp fastener.

In one embodiment of the present invention, the first link member pivotally connected to the base member and the chain guide about first and second pivot axes, respectively. The first link member includes first and second arms extending between the first and second pivot axes. The second link member is pivotally connected to the base member and the chain guide about third and fourth pivot axes. A biasing member is disposed coaxially about the first pivot axis and between the first and second arms of the first link member. The biasing member biases the first link member toward the base member. The first and second link members extend downwardly relative to the base member. A cable-actuated lever is integrally connected to the first link member for displacing the chain guide to shift the chain. The biasing member is a coil spring.

The present invention provides a derailleur having a hidden, yet accessible, clamp fastener which is protected from dirt and external forces. Further, the relocation of clamp fastener attachment to the derailleur side of the seat tube leaves the opposite side of the bicycle free from protrusions.

These and other features and advantages of the present invention will be more fully understood from the following description of one or more embodiments of the invention, taken together with the accompanying drawings.

DETAILED DESCRIPTION

Figure 1:
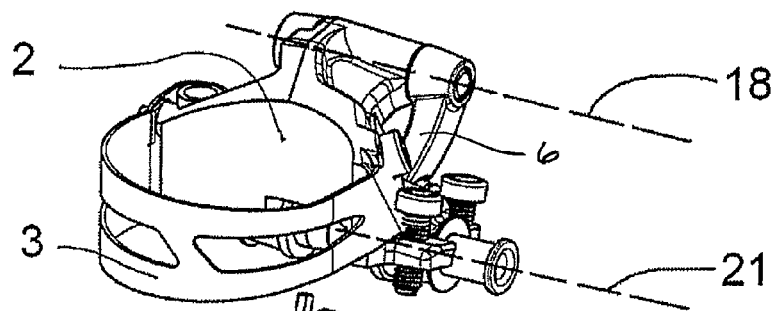
FIG. 1 is an isometric view of a clamp and a second link member connected to a base member of a derailleur according to one embodiment of the present invention.
Figure 2:
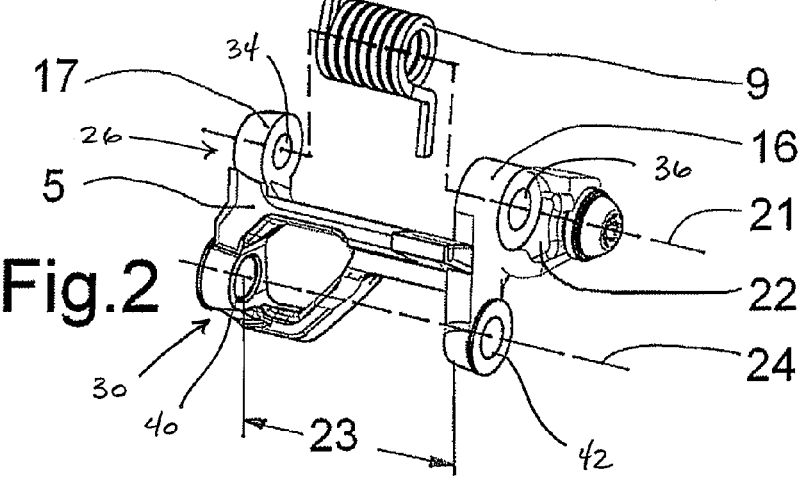
FIG. 2 is an isometric view of a first link member and a biasing member of the derailleur.
Figure 3:
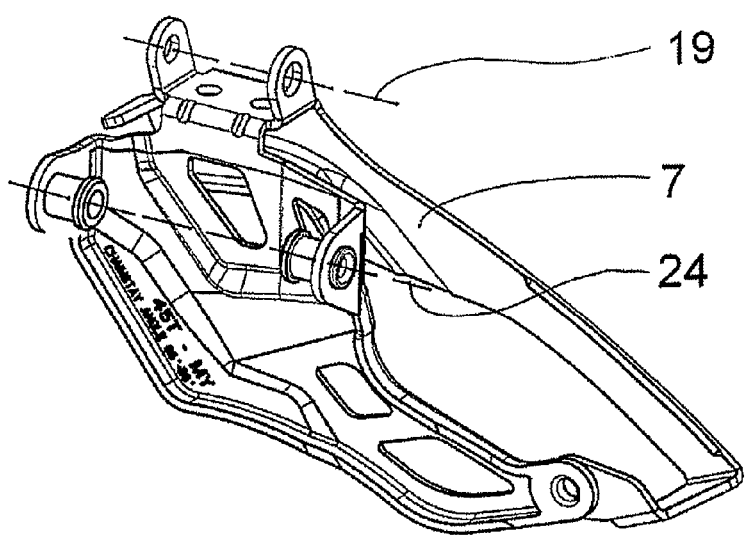
FIG. 3 is an isometric view of a chain guide of the derailleur.

FIGS. 1-5 illustrate a derailleur 1 detachably mountable to a seat tube 8 of a bicycle frame according to one embodiment of the present invention. The derailleur 1 is actuated by pulling and releasing a control cable (not shown) to laterally displace a chain between chainrings. The derailleur 1 generally includes a base member 2, a chain guide 7, first and second link members 5, 6, a biasing member 9 and a cable-actuated lever 22. The base member 1 is fixedly mountable to the seat tube 8 of the bicycle frame. The chain guide 7 receives and laterally displaces the chain between chainrings. The first and second link members 5, 6 are pivotally connected to the base member 2 at their upper ends 26, 28 about first and third pivot axes 21, 18, respectively. The first and second link members 5, 6 are also pivotally connected to the chain guide 7 at their lower ends 30, 32 about second and fourth pivot axes, 24, 19, respectively. The biasing member 9 biases the first link member 5 toward the base member 2. The cable-actuated lever 22 is operatively connected to the first link member 5 and receives an end of the control cable.

The first link member 5 includes first and second arms 16, 17 having first and second openings 34, 36 for receiving a pin 38 pivotally connecting the base member 2 about the first pivot axis 21. The biasing member 9, in this embodiment a coil spring, is coaxial with the pin 38. One end of the biasing member 9 is supported on the base member 2 and the other end presses against the first link member 5, biasing the first link member 5 toward the base member 2 into a rest position. The arrangement of the biasing member 9 between the first and second arms 16, 17 provides a support width 23 at the pivot axis 24 of the first link member 5 which is connected to the chain guide 7. The first and second arms 16, 17 also include third and fourth openings 40, 42 pivotally connect to the chain guide 7 about the second pivot axis 24. While a single pin extends through the first and second openings 34, 36, two separate pins extend through the third and fourth openings 40, 42. The cable-actuated lever 22 is integral with the first link member 5. Alternatively, the cable-actuated lever 22 may be discrete from the first link member 5.

In this embodiment, the second link member 6 is arranged above the first link member 5. The second link member 6 includes first and second arms 44, 46 pivotally connected to the base member 2 about the third pivot axis 18 and pivotally about the fourth pivot axis 19. The base member 2 forms an upper terminus of the derailleur 1, the first and second link members 5, 6 extending generally downwardly toward the chain guide 7.

Figure 4:
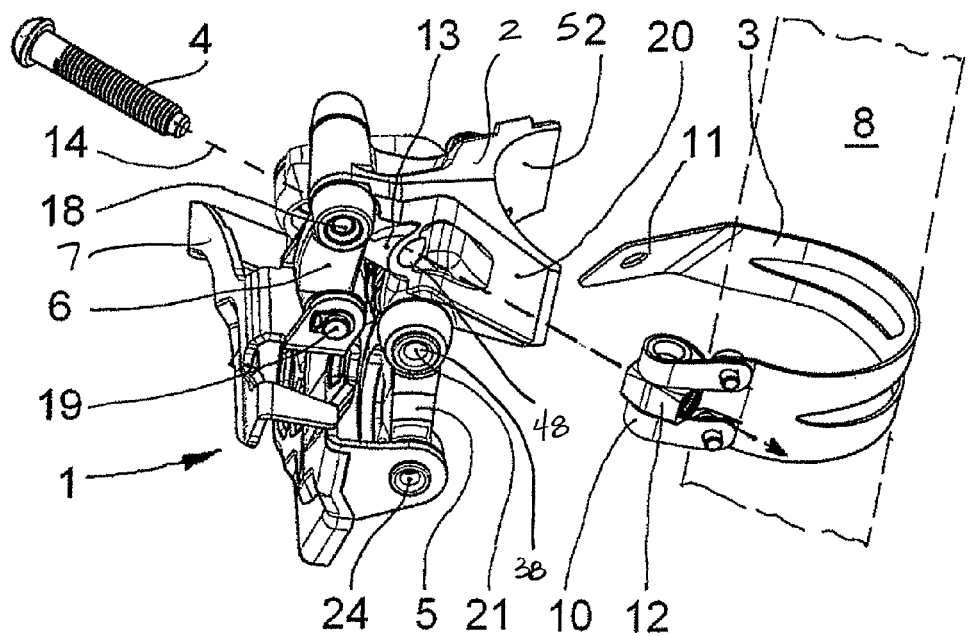
FIG. 4 is a partially exploded isometric view of the derailleur.

Looking to FIG. 4, the base member 2 includes a concave cylindrical surface 52 configured to matingly engage the seat tube 8. The clamp 3 includes first and second ends 11, 10. The first end 11 is pinned to the base member 2 and the second end 10 includes a threaded portion 12 for receiving a clamp fastener 4, in this embodiment a clamp bolt. The clamp 3 may be partially made from spring strip steel, its second end 10 looped to receive and form a pinned connection for the threaded portion 12. The base member 2 includes a boss 13 having a bore 48 and a ramp 20 for guiding the second end 10 of the clamp 3. The ramp 20 extends generally tangentially to a diameter of the seat tube 8 and is configured to align the threaded portion 12 with the bore 34 in the boss 13 of the base member 2.

Figure 5:
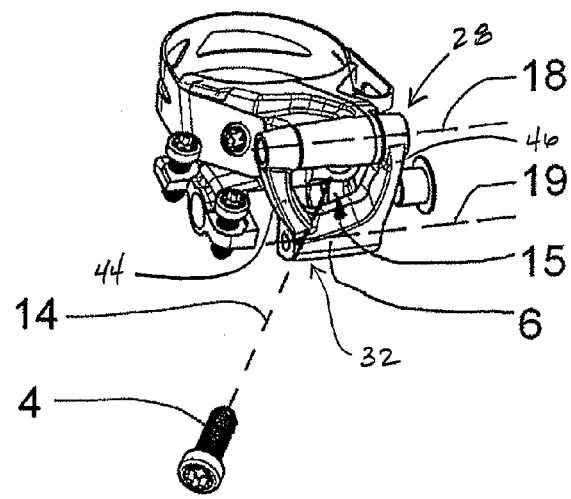
FIG. 5 is an isometric view of the clamp, the second link member, base member of FIG. 1 showing a path of fastener insertion.

Looking to FIGS. 4 and 5, to mount the derailleur 1 to the seat tube 8, the concave cylindrical surface 52 of the base member 2 is positioned against the seat tube 8 and the clamp 3 is wrapped around the seat tube 8. The clamp fastener 4 is then inserted through an opening 15 formed in the second link member 6, along an insertion line 14, into the bore 48 of the base member 2 and into the threaded portion 12. Finally, the clamp fastener 4 is threadably tightened by inserting a standard tool through the opening 15 of the second link member 6. As the fastener 4 is tightened, the threaded portion 12 slides along the ramp 20 of the base member 2, securing the clamp 3 to the seat tube 8. A head of the clamp fastener 4 is supported on the boss 13 of the base member 2.

While this invention has been described by reference to an embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A derailleur mountable to a bicycle frame comprising:
   a clamp mountable to the bicycle frame, the clamp including a first end having a threaded portion receiving a clamp fastener for tightening of the clamp about the bicycle frame;
   a base member connected to the clamp, the base member including a bore receiving the clamp fastener;
   a chain guide for receiving and laterally displacing a chain; and
   first and second link members pivotably connecting the base member and the chain guide, one of the link members including an opening aligned with the bore such that the clamp fastener passes through the opening and into the bore of the base member.

2. The derailleur of claim 1 wherein the clamp is mountable to a seat tube of the bicycle frame, the base member forming an upper terminus of the derailleur, the first and second link members extending generally downwardly toward the chain guide, one of the first and second link members pivotably biased toward a rest position.

3. The derailleur of claim 2 wherein the clamp fastener is installed and uninstalled through the opening in the second link member using a standard tool.

4. The derailleur of claim 3 wherein the base member includes a ramp slidably guiding the first end of the clamp during threading of the clamp fastener.

5. A derailleur mountable to a bicycle frame comprising:
   a clamp mountable to the bicycle frame;
   a base member connected to the clamp;
   a chain guide for receiving and laterally displacing a chain;
   a first link member pivotally connected to the base member and the chain guide about first and second pivot axes, respectively, the first link member including first and second arms extending from the first of the first and second pivot axes to the second of the first and second pivot axes;
   a second link member pivotally connected to the base member and the chain guide about third and fourth pivot axes, respectively, wherein the second link is arranged above the first link member;
   a biasing member disposed coaxially about the first pivot axis and between the first and second arms of the first link member, the biasing member biasing the first link member toward the base member; and
   a cable-actuated lever integrally connected to the first link member for operating the derailleur to displace the chain guide.

6. The derailleur of claim 5 wherein the clamp is mountable to a seat tube of the bicycle frame, the base member forming an upper terminus of the derailleur.

7. The derailleur of claim 6 wherein the first and second link members extend generally downwardly relative to the base member.

8. The derailleur of claim 5 wherein the biasing member is a coil spring.

* * * * *